United States Patent [19]

Mass et al.

[11] Patent Number: 5,399,383
[45] Date of Patent: Mar. 21, 1995

[54] PROCESS FOR PRIMING PLASTIC SUBSTRATES, COATING COMPOSITIONS FOR THIS PURPOSE, AND THE USE THEREOF

[75] Inventors: Manfred Mass, Wuppertal; Klaus Bederke, Sprockhövel; Hermann Kerber, Wuppertal, all of Germany

[73] Assignee: Herberts Gesellschaft Mit Beschrankter Haftung, Wuppertal, Germany

[21] Appl. No.: 197,355

[22] Filed: Feb. 16, 1994

Related U.S. Application Data

[63] Continuation of Ser. No. 44,910, Apr. 8, 1993, abandoned, which is a continuation of Ser. No. 877,549, May 1, 1992, abandoned.

[30] Foreign Application Priority Data

May 13, 1991 [DE] Germany .................. 41 15 588.2

[51] Int. Cl.$^6$ .................................................. B05D 7/02
[52] U.S. Cl. ............................................... 427/393.5
[58] Field of Search ........................................ 427/393.5

[56] References Cited

U.S. PATENT DOCUMENTS

| | | | |
|---|---|---|---|
| 4,013,615 | 3/1977 | Ohashi et al. | 260/42.53 |
| 4,184,022 | 1/1980 | Lawyer | 521/118 |
| 4,184,023 | 12/1980 | Cuscurida | 521/129 |
| 4,656,243 | 4/1987 | Pedain et al. | 528/302 |
| 4,757,113 | 7/1988 | Paar | 525/124 |
| 4,839,414 | 6/1989 | Bederke et al. | 524/507 |
| 4,851,460 | 7/1989 | Stranghoner et al. | 523/407 |
| 4,857,580 | 8/1989 | Patzschke et al. | 524/507 |
| 4,865,704 | 9/1989 | Saatweber et al. | 204/181.7 |
| 4,865,705 | 9/1989 | Hendrikx et al. | 204/181.7 |
| 4,909,915 | 3/1990 | Bederke et al. | 427/12 |
| 5,045,171 | 9/1991 | MacDonald | 204/296 |
| 5,109,040 | 4/1992 | Honig et al. | 523/411 |

FOREIGN PATENT DOCUMENTS 2014678 10/1990 Canada.

*Primary Examiner*—Shrive Beck
*Assistant Examiner*—Erma Cameron
*Attorney, Agent, or Firm*—Fitch, Even, Tabin & Flannery

[57] ABSTRACT

A process for priming of plastic substrates without adverse effects on the mechanical stability by applying to a plastic substrate, particularly a polyolefin substrate, a coating composition which comprises from 10 to 35% by weight of binders having an OH number of from 40 to 150, prepared from (meth)acrylamides, hydroxyalkyl (meth) acrylates and copolymerisable, olefinically unsaturated compounds with subsequent modification by means of polyisocyanates, up to 20% by weight of further binders, from 30 to 70% by weight of organic solvents, from 15 to 45% by weight of pigments and/or fillers, from 0 to 15% by weight of additives and from 1 to 30% by weight of epoxide- or polyisocyanate-based crosslinking agents.

12 Claims, No Drawings

PROCESS FOR PRIMING PLASTIC SUBSTRATES, COATING COMPOSITIONS FOR THIS PURPOSE, AND THE USE THEREOF

This application is a continuation of application Ser. No. 08/044,910, filed Apr. 8, 1993, now abandoned, which is a continuation of application Ser. No. 07/877,549, filed May 1, 1992, now abandoned.

The invention relates to the painting, in particular priming, of plastic substrates, in particular polypropylene substrates. It is particularly suitable for the painting of motor vehicle parts made of plastics, in particular polypropylene.

Plastic parts are becoming increasingly widespread in industry. They are used alone or alternatively together with other parts. In order to produce a good and visually uniform surface, it is frequently necessary to coat these parts with a paint. The paint has a number of tasks here. On the one hand, it serves to give the substrate a uniform surface, possibly not differing from the surface of adjacent parts comprising another substrate. In addition, the coating protects the surface against environmental influences, for example moisture or rain, i.e. the weathering resistance is improved. This results in a longer service life of the parts. It is furthermore possible for certain properties to be affected in a targeted manner by the coating, for example the surface slip or electrical conductivity of plastic parts.

In order to ensure these properties, it is necessary for the coating to adhere firmly to the substrate. In particular in the case of mechanical load, the paint must not come off the surface of the plastic part. It must also be ensured that the mechanical properties of the plastic part are still adequate after painting. Finishes on plastic substrates usually have a clearly adverse effect on the mechanical stability of the plastic parts. This is particularly true at low temperatures. The problem is discussed, for example, in "Farbe+Lack", No. 5 (1988), p. 337, and in "defazet", No. 2 (1979), p. 59.

In order to achieve good adhesion, the known primers have high solvent contents. The solids content of the coating compositions is between 2 and 30%.

EP-A-0 250 052 describes a process in which plastic parts are provided with a plurality of coatings of a coating composition. The essential feature of this process is that the primer comprises two different coatings containing binders based on specific polyesters, these coatings being applied by the wet-on-wet method. By providing that the coatings have different elasticities, it is said that particularly good stone chip resistance is achieved. This process has the disadvantage that two different coating operations are required for the priming alone.

EP-A-0 267 376 describes the painting of transparent flexible plastic sheets. The process involves providing the flexible substrate with a finish of a two-component acrylate-based varnish. This varnish must be highly elastic, i.e. have an elongation at break of greater than 100%. Although the coating achieved in this process is highly elastic, it does not satisfy the conditions regarding hardness and scratch resistance required for an automotive primer. In addition, only specific substrates are painted.

JP-57/198 763 describes coating compositions for polyolefin substrates. The binder mixture therein comprises from 10 to 90% by weight of a copolymer of methacrylamides and unsaturated monomers which are copolymerisable therewith, and from 90 to 10% by weight of chlorinated polyolefins. A crosslinking agent is not used in this coating composition, and the coating dries physically.

JP-56/050 971 describes plastic substrate coating compositions which comprise a mixture of an acrylate polymer, a chlorinated polyolefin and a resin containing more than two epoxide groups per molecule. The acrylate polymer comprises basic nitrogen-containing acrylic monomers and (meth)acrylate monomers and further copolymerisable monomers. The epoxide group-containing component is an epoxide group-containing polyether.

The object of the invention is to provide a primer which can be used to coat plastic parts, in particular motor vehicle parts, with good adhesion to the substrate. In addition, the finish should not have any significant adverse effect on the mechanical stability of the substrate. Furthermore the coated substrates should have good low-temperature impact strength.

This object is achieved by the process, forming the subject-matter of the invention, for priming plastic substrates by applying a solvent-borne coating composition and subsequently curing the coating, which process is characterised in that a coating composition is used which is based on A) from 10 to 35% by weight of one or more binders having an OH number of from 40 to 150 and obtainable by reacting copolymers containing OH groups and built up from (meth)acrylamides, hydroxyalkyl (meth)acrylates and copolymerisable, olefinically unsaturated compounds and having a number average molecular weight (Mn) of from 3,000 to 100,000 and a glass transition temperature of from $-20°$ to $+75°$ C., with polyisocyanates, B) from 0 to 20% by weight, for example from 0 to 19.5% by weight, of further binders, C) from 30 to 70% by weight of organic solvents, D) from 15 to 45% by weight of pigments and/or fillers, E) from 9 to 15% by weight of paint additives, and F) from 1 to 30% by weight of a crosslinking agent based on one or more epoxy resins containing free epoxide groups or on one or more polyisocyanates.

In the process according to the invention, the coating composition is applied to the substrate and then dried with or without crosslinking at room temperature or elevated temperature. The resultant primer can, if desired, be overcoated by further coatings, for example fillers, undercoats or topcoats. Application can be effected by the wet-on-wet method, after which the entire coating system is cured together.

The binders which can be employed according to the invention are copolymers based on (meth)acrylamides and hydroxyalkyl (meth)acrylates and monomers which are copolymerisable therewith and contain olefinic double bonds, these copolymers having been modified by means of one or more polyisocyanates.

The term (meth)acryl . . . used here, for example in connection with (meth)acrylamides, (meth)acrylates, hydroxyalkyl (meth)acrylates, etc., in each case means methacryl . . . and/or acryl . . . , i.e. methacrylamides and/or acrylamides, methacrylates and/or acrylates, hydroxyalkyl methacrylates and/or hydroxyalkyl acrylates, etc.

The copolymers on which the binders are based are preferably built up from the following monomers: from 0.5 to 40% by weight of (meth)acrylamides based on (meth)acrylic acid and ω-tert-aminoalkylamines and/or primary amines, from 10 to 40% by weight of hydroxyalkyl (meth)acrylates and from 20 to 89.5% by weight of copolymerisable olefinic unsaturated compounds. The polymerisation is preferably carried out as a solution polymerisation at temperatures between 60° and 160° C., preferably between 80° and 140° C. The polymerisation reaction is initiated by means of known polymerisation initiators. Suitable initiators are per and azo compounds. It is also possible to employ chain-transfer agents.

The polymerisation condition (temperature, solvent concentration, monomer metering rate) are selected so that the molecular weight is between 3,000 and 100,000. The copolymers have a glass transition temperature of from −20° to +75° C.

From 80 to 95% by weight of the copolymer obtained above are modified by means of from 5 to 20% by weight of one or more polyisocyanates which react with the OH groups of the copolymers and contain unmasked and optionally also masked isocyanate groups. The process is carried out so that the modified binder obtained has an OH number of from 40 to 150, for example from 60 to 150, preferably from 80 to 120. The acrylate resin can subsequently be modified via the OH groups. It is likewise possible, if desired, to react the OH groups of the monomers before the polymerisation.

Specific examples of preferred tertiary amino group-containing (meth)acrylamide monomers are N-(N,N-diethylaminopropyl)(meth)acrylamide and N-(N,N-dimethylaminoneopentyl)(meth)acrylamide. The alkyl substituents on the tertiary amine are preferably $C_1$–$C_4$-alkyl groups, and the alkyl group on the amide nitrogen has from 1 to 18 carbon atoms. Examples which may be mentioned of alkyl-substituted (meth)acrylamides are N-methyl-, N-n-propyl- and N-n-butyl(meth)acrylamide. However, further $C_1$–$C_8$-alkyl substituents, possibly also substituted, are possible. Preferred hydroxyalkyl (meth)acrylates are those containing a $C_2$–$C_8$-alkyl radical. Examples are hydroxyethyl acrylate, hydroxyethyl methacrylate, 2-hydroxypropyl acrylate and 4-hydroxybutyl methacrylate. These monomers may optionally be reacted at the OH group before the polymerisation. For example, compounds containing reactive epoxide groups or reactive isocyanate groups can be reacted with these OH-functional monomers.

Examples of further copolymerisable monomers are: phenylaromatic compounds, such as styrene, (meth)acrylates, such as methyl, ethyl, n-butyl, isobutyl and tert-butyl acrylates or methacrylates, vinyl esters, such as vinyl acetate, and alkyl esters of unsaturated polycarboxylic acids.

The copolymers obtained as described above for the preparation of the binders employed according to the invention are further reacted with polyisocyanates, at least some of which contain unmasked isocyanate groups which react with the OH groups of the copolymer. However, they may also additionally contain masked isocyanate groups. Preference is given to partially masked polyisocyanates. Masking agents which can be used are conventional CH-, NH- or OH-acidic compounds, such as CH-acidic esters, for example alkyl acetoacetates, ε-caprolactam, alcohols, such as tert-butanol, and oximes, such as methyl ethyl ketoxime.

The copolymer obtained above is expediently reacted with the polyisocyanate in such a manner that the equivalent ratio between the reactive hydroxyl groups of the copolymer and the isocyanate groups of the partially masked or unmasked polyisocyanate is from 99:1 to 70:30, preferably from 95:5 to 85:15.

Preference is given to polyisocyanates which contain biuret, urethane or isocyanurate groups in their molecule; materials of this type are conventional commercial products.

It is expedient according to the invention to carry out the reaction with the copolymer using polyisocyanates containing only one free isocyanate group per molecule. These can be prepared from commercial products by reaction with an appropriate amount of masking agent. Examples of polyisocyanates which can be used are the biuret group-containing product of the reaction of hexamethylene diisocyanate and water, for example the product of the reaction of 3 mol of hexamethylene diisocyanate with 1 mol of water, having an NCO content of about 22% (corresponding to the commercial product Desmodur N ®); an isocyanurate group-containing polyisocyanate prepared, for example, by trimerisation of hexamethylene diisocyanate, having an NCO content of about 21.5% (corresponding to the commercial product Desmodur 3390 ®); or urethane group-containing polyisocyanates, for example products of the reaction of 3 mol of diisocyanate with 1 mol of triol, for example tolylene diisocyanate and trimethylolpropane, NCO content about 17.5% (corresponding to the commercial product Desmodur L ®).

Corresponding products of the reaction of copolymers and polyisocyanates are described, for example, in EP-A-0 260 456.

Together with the above-described binders (component A), it is also possible to add up to 30% by weight of further binders (component B), based on the weight of binder (component A) and crosslinking agent (component F). These additional binders are polyesters or polyurethane resins which are known for the preparation of coating compositions. They are linear or branched, hydroxyl- or carboxyl-functional, saturated polyesters or polyurethanes. They may also be OH-functional. The molecular weight (Mn) is from about 500 to 5,000, the acid number is from 5 to 30, and the OH number is from 40 to 160. The polyesters are prepared by reacting di- or tricarboxylic acids with diols or polyols. The choice of the components can be used to influence, for example, the degree of branching, the functionality or the viscosity. The binders can be reacted via reactive groups with diisocyanates or polyisocyanates. This gives urethane group-containing polymers which have somewhat lower functionalities and higher molecular weights. Polyurethane resins are formed, for example, by reacting polyethers with di- or polyisocyanates. The choice of the starting materials allows the branching, flexibility or further functional groups to be influenced. Such binders are described, for example, in DE-A-34 21 122 and EP-A-0 393 609.

Further known binders can optionally be added to these binders. These are OH-functional polyesters or polyurethane resins. It is also possible to additionally use known crosslinking agents, such as, for example, melamine resins, urea resins or benzoguanamine resins, as described, for example, in EP-A-0 245 786. They are used to crosslink the additional binder component.

Examples of crosslinking agents for the coating compositions according to the invention are epoxy resins or masked or unmasked polyisocyanates. The polyisocyanates are the conventional isocyanates for paints, as described, for example, in "Farbe+Lack" 12, 1983, p. 928 and in EP-A-0 247 443. It is possible to employ aliphatic or aromatic isocyanates, but aliphatic isocyanates are preferred. The functionality of the isocyanates should be >2. If reactive isocyanate compounds are employed, it is preferred to employ two-component systems in which the binder and crosslinking agent are stored separately. The reactivity of the crosslinking agent is so great that crosslinking may take place even at room temperature. This can be accelerated by addition of catalysts.

If masked isocyanates are employed, one-component systems can be prepared. These require elevated temperature for crosslinking since, in a first reaction step, the masking agent must first be removed, and crosslinking then occurs. Masking agents which can be employed are conventional known monoalcohols, monoamines, oximes or lactam compounds.

The crosslinking agents which can be employed are likewise epoxide group-containing resins. These are known epoxide group-carrying compounds, such as, for example, products of the reaction of epichlorohydrins with aromatic bisphenols. They should have a functionality of about 2. The molecular weight is from about 400 to 4,000. Preference is given to epoxy resins based on aromatic compounds. Examples of such components are products of the reaction of bisphenol A and epichlorohydrin (Epicore ® grades) or products of the reaction of novolaks with epichlorohydrin. These compounds are commercially available and are generally employed as viscous liquids, i.e. if necessary dissolved in solvents.

Catalysts which can be employed are known epoxide and isocyanate catalysts, for example amine compounds or heavy-metal compounds. Examples of these are trialkylamine, dibutyltin dilaurate or zinc octanoate. The catalysts are employed in conventional small amounts. In the case of two-component materials, it must be ensured that the pot life of the finished paint still enables adequate processing and adequate flow. This can be achieved, for example, via the amount of catalyst or via the reactivity of the isocyanate or of the epoxy resin. In the case of one-component materials, the demasking and the crosslinking reaction can be influenced via the catalyst.

The pigments or fillers used can be pigments or fillers which are conventional in the paints industry. These include, for example, coloured or non-coloured organic or inorganic pigments, for example titanium dioxide, carbon black, iron oxides, organic or inorganic fillers, for example talc, aluminium silicate, organic crosslinked microparticles, corrosion-protection pigments, transparent or highly disperse pigments, for example pyrogenic silicic acid, conductivity pigments or solid catalysts. The pigments must be dispersed and then ground so that the particle size is very small, making possible a smooth surface of the coating film. Suitable equipment for this purpose is disclosed in the literature.

Suitable solvents are conventional paint solvents. The viscosity can be influenced via the solvency for the binder.

The physical drying of the paint surface can be adjusted via the boiling point of the solvents. Low-boiling solvents cause rapid drying, while high-boiling solvents keep the paint film liquid for some time and thus enable good flow-out. For environmental protection reasons, the solvent content should be relatively low. Examples of solvents are ketones, such as, for example, methyl isobutyl ketone, alcohols, such as, for example, ethanol or butanol, glycols, such as, for example, propylene glycol, ethers, such as, for example, diglycol dimethyl ether, linear, branched, cyclic, aliphatic or aromatic hydrocarbons, such as, for example, cyclohexane, n-hexane, decane, toluene or xylene, esters, such as, for example, ethyl or butyl acetate, or mixtures thereof. Solvents should also be selected taking into account the aspect of occupational safety, i.e. they should have the lowest possible toxicity. For this reason, halogenated hydrocarbons are not preferred.

Additives which can be used are known additives. Examples of these are flow-control agents, antifoaming agents, antipitting agents, catalysts and wetting agents. These additives are known in principle and can be selected depending on the properties to be influenced. It should be ensured here that they do not impair the adhesion to the subsequent coatings. A specific class of substances comprises adhesion promoters. These also serve to ensure that the coating film adheres to the substrate. The adhesion promoters can be matched particularly well to the substrate. In the case of specific substrates, these can significantly improve the adhesion. The additives are selected so that they do not have any adverse effect on the shelf life of the coating composition before application.

Preferred examples of adhesion promoters are chlorinated polyolefins (CPO). In the case of certain substrates, for example polyolefins, these can result in significantly better adhesion values. The amount of CPOs used is from 0.1 to 15%, preferably between 0.5 and 7.5%. Examples of chlorinated polyolefins are polyethylene or polypropylene polymers having a degree of chlorination of from 10 to 40% by weight of chlorine and a number average molecular weight (Mn) of from 5,000 to 50,000. Preference is given to CPOs based on polypropylene. The CPOs are commercially available and are usually in the form of solutions in organic solvents, so that they have a viscosity which is suitable for processing. The solids content of these solutions can be varied within broad limits, depending on the solvent and the CPO used.

The coating composition according to the invention may contain additional binders. These binders, which should also react with the crosslinking agent and thus give a homogeneous coating film, allow properties in the film to be influenced in a targeted manner. Thus, for example, the elasticity can be improved. Furthermore, some resins have an adhesion-promoting action. A further possibility is that in some cases the addition of resin can improve the chemical stability of the coating. It is likewise possible to control the viscosity and flow-out properties in a targeted manner. The additional binders can be based on conventional film-forming polyester resins, polyurethane resins, polyurea resins, phenolic resins or polyether binders.

Examples of known binders of this type which can be used are described in the patents DE-A-34 21 122 and EP-A-0 393 609. However, the proportion of these binders should be at most 30% by weight of the total solids content of binders and crosslinking agent.

The solids content of the coating composition according to the invention is generally from 30 to 70% by weight. It depends on the method of application and the viscosity required. The solids content can be higher in the storage form and only adjusted, by means of solvents, just before application of the coating composition.

Coating compositions can be prepared by known processes from the binders, pigments and additives. To this end, for example, the constituents are mixed thoroughly and homogenised and then ground in known equipment. The coating composition is then adjusted to a suitable viscosity by means of solvent. It is possible to formulate one-component materials or two-component materials, i.e. the curing agent may form a second component together with parts of the additives, solvents and pigments. Just before application, the two components are mixed in the predetermined mixing ratio, giving the ready-for-use paint. This can then be processed within a certain time. The drying and the crosslinking reaction can either occur at room temperature or at elevated temperature. If one-component materials are processed, these are generally only crosslinked at elevated temperature.

Suitable substrates are conventional plastic substrates; however, other surfaces, for example metal surfaces, can also be coated. Examples of resin bases for the plastic substrates are: phenol-formaldehydes, polyurethane resins, polyurea resins, polyolefins, polyesters, PVC, polyamides, polycarbonates, and the like. Preference is given to substrates based on polyamide or polyolefins, particularly preferably based on polypropylene. The substrates may be flexible, i.e. in the case of impact-like damage they can be deformed within certain limits, either elastically or permanently.

These substrates are prepared by conventional methods. Thus, it is possible, for example, to sand the surface in order to remove burrs or flaws. Moreover, these parts can be washed with solvents or aqueous solutions. In addition, oxidative pretreatment is possible, such as, for example, flame-treatment of the parts. The coating composition is applied onto the substrates to be treated in this way.

Application can take place in various ways. It is determined, inter alia, by the geometry of the substrates. For example, the coating compositions can be applied to the substrate by spraying. However, it is also possible for the substrates to be rolled or dipped or coated in another manner. The viscosity of the coating composition must be adjusted depending on the method of application. After application, the polymer film crosslinks either at room temperature or at elevated temperature. It is then possible to apply further coats of coating films. The coating thickness is generally from 5 to 80 µm, depending on the application envisaged, but preferably from 10 to 35 µm. The drying conditions vary within broad limits between 10° and 160° C. Temperatures of from 10° to 100° C. are particularly suitable for two-component materials, and from 80° to 160° C. for one-component materials. If different plastic substrates have different heat resistance, the choice of coating composition can be made depending on the drying temperatures to be used.

Working according to the invention gives a homogeneous surface on substrates of various types. The method is thus particularly suitable for producing further paint films on these substrates. The primer-coated plastic substrates have good low-temperature impact strength. The adhesion of the coating to the plastic substrate is also good. The substrates coated in this way can be used in the automotive industry and for other purposes. Since the coating compositions can be crosslinked at various temperatures, it is possible to match this temperature to the particular substrate. This ensures the dimensional stability and structure of the plastic substrates.

The examples below serve to illustrate the invention. Parts (P) and percentages (%) in each case relate to the weight.

EXAMPLE 1

Preparation of a Binder

200 P of butyl acetate and 132 P of xylene are introduced into a 4-liter flask fitted with stirrer, thermometer, condenser and two dropping funnels, and the mixture is heated to 100° C. with stirring. A mixture of dimethylaminopropylmethacrylamide (200 P), 2-ethylhexyl acrylate (98 P), 2-hydroxypropyl methacrylate (360 P), isobutyl methacrylate (160 P), methyl methacrylate (78 P) and styrene (160 P) is added dropwise over the course of 5 hours at the same time as an initiator mixture comprising butyl acetate (270 P), xylene (143 P) and azobisisobutyronitrile (17 P); the temperature is kept at precisely 100° C., and a further 144 parts of the initiator mixture are added when the dropwise addition is complete. The dropping funnels are rinsed with 20 parts of butyl acetate, and the batch is polymerised at 100° C. for 3 hours. The conversion is then about 98%. The copolymer is diluted with 407 P of butyl acetate and cooled to 60° C. 82 P of a mono-masked isocyanate are prepared by reacting 560 parts of the trimer of hexamethylene diisocyanate with 197 P of ethyl acetate in a mixture of 150 P of xylene and 90 P of methoxypropyl acetate, the isocyanate is added to the copolymer obtained above, and the mixture is kept at 60° C. for 2 hours. The binder obtained contains virtually no NCO.

EXAMPLE 2

40 P of the acrylic resin (copolymer) of Example 1 (50% in butyl acetate) are mixed homogeneously with 25.5 P of titanium dioxide, 2 P of finely disperse silicic acid, 0.5 P of carbon black and 10 P of a commercially available CPO solution (about 20% of chlorinated polyolefin in xylene), and the mixture is adjusted to a suitable viscosity by means of xylene and ground. The solids content is adjusted to about 50% by means of further xylene, and 10 P of a solution of a commercially available polyepoxy resin (Mn about 400, epoxide equivalent weight about 400, 50% in butyl acetate) are added to this mixture and homogenised thoroughly. This primer is sprayed onto the substrate and crosslinked at elevated temperature.

EXAMPLE 3

50 P of an acrylic resin as in Example 1 are mixed with 4 P of titanium dioxide, 0.05 P of carbon black, 0.45 P of finely disperse silicic acid, 18.5 P of aluminium/magnesium silicate and 15 P of commercially available CPO solution, the solids content is adjusted to about 55% by means of a little butyl acetate, and the mixture is ground. Before use, 10 P of a commercially available aliphatic polyisocyanate (Desmodur N ®, trimer of hexamethylene diisocyanate) are added to and mixed with this mixture. This primer is sprayed onto the substrate and crosslinked at elevated temperature.

EXAMPLE 4

16 P of an OH-containing polyester as described in EP-A-0 393 609 and 4 P of a commercially available melamine resin (in each case 50% in BuOH) are added to 24 P of acrylic resin as described in Example 1 (50%), the mixture is mixed with 12 P of titanium dioxide, 13 P of barium sulphate and 2 P of bentone and about 14 P of xylene, and the mixture is dispersed thoroughly. 5 P of crosslinking agent prepared from the trimer of hexamethylene diisocyanate and masked with butanone oxime, are added. Before application, the system is adjusted to a suitable spraying viscosity by means of about 10 P of butyl acetate. The paint is baked at 120° C.

EXAMPLE 5

53 P of an acrylic resin as described in Example 1 are mixed with 5 P of titanium dioxide, 1 P of carbon black and 18 P of aluminium/magnesium silicate, adjusted to a solids content of about 55% by weight by means of butyl acetate and ground. Before use, 10 P of a commercially available aliphatic polyisocyanate (trimer of hexamethylene diisocyanate) are added to and mixed with this mixture. This mixture is adjusted to the viscosity necessary for processing by means of a little xylene and sprayed onto the substrate. It is crosslinked at elevated temperature.

Comparative Experiment

14 P of a polyurethane resin (50% strength in butyl acetate) as described in DE-A-34 21 122 are combined with 5 P of a commercially available CPO solution (solids content 20%), 10 P of titanium dioxide, 0.5 P of finely disperse silicic acid and 9.5 P of aluminium/magnesium silicate. About 60 P of a 1:1 mixture of xylene and butyl acetate are added, and the mixture is finely dispersed in a suitable unit. Before spray-application, 5 P of a commercially available isocyanate (trimer of hexamethylene diisocyanate) and about 5 P of butyl acetate are added in order to establish the suitable viscosity. The mixture is homogenised, sprayed onto the substrate and crosslinked at elevated temperature.

The paints of Examples 2, 3, 4 and 5 above and of the Comparative Experiment were applied to polypropylene panels measuring 10×15 cm in a thickness of 3 mm. The panels had previously been washed with a solution of demineralised water and 50% of propanol and dried at 25° C. for 10 minutes. The primer according to the invention was applied by spraying and, after drying for 5 minutes, baked at 80° C. for 15 minutes.

The primer was subsequently oversprayed with a commercially available, highly elastic, two-component polyurethane topcoat, which, after drying for 5 minutes, was re-baked at 80° C. for 45 minutes. A coating thickness of 35 μm was achieved.

The panels obtained were subjected to a penetration test in accordance with DIN 54443 at −25° C., in which the total energy absorption ($W_{tot}$) was measured. The results obtained are shown in the table below.

|  | Primer coating thickness | Total energy absorption ($W_{tot}$) |
| --- | --- | --- |
| Comparative Experiment | 20 μm | 20–50% |
| Example 2 | 20 μm | 80–100% |
| Example 3 | 25 μm | 80–100% |
| Example 4 | 15 μm | 70–90% |
| Example 5 | 15 μm | 70–90% |
| Unpainted sample | ./. | 100% |

We claim:

1. Process for priming plastic substrates by applying a solvent-borne coating composition and subsequently curing the coating, characterised in that a coating composition is used which is based on
   A) from 10 to 35% by weight of one or more binders having an OH number of from 40 to 150 and obtained by reacting copolymers containing OH groups and built up from (meth)acrylamides, hydroxyalkyl (meth)acrylates and copolymerisable, olefinically unsaturated compounds and having a number average molecular weight (Mn) of from 3,000 to 100,000 and a glass transition temperature of from −20° to +75° C., with polyisocyanates,
   B) from 0 to 20% by weight of further binders,
   C) from 30 to 70% by weight of organic solvents,
   D) from 15 to 45% by weight of pigments and/or fillers,
   E) from 0 to 15% by weight of paint additives, and
   F) from 2 to 20% by weight of a crosslinking agent based on one or more epoxy resins containing at least two epoxide groups per molecule.

2. Process according to claim 1, characterised in that a coating composition is used in which the binder component A) is a product of the reaction of
   a) from 80 to 95% by weight of a copolymer of
      from 0.5 to 40% by weight of one or more (meth)acrylamides based on ω-tert-aminoalkylamines and/or primary amines;
      from 10 to 40% by weight of one or more hydroxyalkyl (meth)acrylates and
      from 20 to 89.5% by weight of one or more copolymerisable, olefinically unsaturated compounds, and
   b) from 5 to 20% by weight of a polyisocyanate containing unmasked and optionally also masked isocyanate groups.

3. Process according to claim 1, characterised in that one or more aromatic epoxy resins are used.

4. Process according to claim 1, characterised in that the crosslinking agent F) used is from 2 to 20% by weight of one or more polyisocyanates containing on average more than two reactive isocyanate groups per molecule.

5. Process according to claim 4, characterised in that one or more aliphatic polyisocyanates are used.

6. Process according to claim 1, characterised in that from 0.1 to 15% by weight of paint additives are used, which are adhesion promoters, antifoaming agents, antipitting agents, catalysts, wetting agents and/or flow-control agents.

7. Process according to claim 6, characterised in that the adhesion promoter used is one or more chlorinated polyolefins having a number average molecular weight (Mn) of from 5,000 to 50,000 and a chlorine content of from 10 to 40% by weight.

8. A process according to claim 1 wherein the plastic substrate primed is a polyolefin.

9. A process which comprises applying coating compositions according to any one of the compositions of claims 2 through 8 as a coating for a plastic substrate.

10. A process according to claim 9 wherein the plastic substrate is a polyolefin.

11. A process according to claim 8 wherein the polyolefin is polypropylene.

12. A process according to claim 9 wherein the plastic substrate is a polyolefin.

* * * * *